US012617536B2

(12) United States Patent
Kubota et al.

(10) Patent No.: US 12,617,536 B2
(45) Date of Patent: May 5, 2026

(54) MOVING OBJECT

(71) Applicant: HONDA MOTOR CO., LTD., Tokyo (JP)

(72) Inventors: Takuya Kubota, Wako (JP); Yuichi Fukuchi, Wako (JP); Azuki Ichikawa, Wako (JP); Hikari Hirayanagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 18/457,857

(22) Filed: Aug. 29, 2023

(65) Prior Publication Data

US 2024/0076043 A1 Mar. 7, 2024

(30) Foreign Application Priority Data

Sep. 2, 2022 (JP) ................................. 2022-139604
Sep. 2, 2022 (JP) ................................. 2022-139607

(51) Int. Cl.
    *B64D 13/08* (2006.01)
    *B64D 13/06* (2006.01)
    (Continued)

(52) U.S. Cl.
    CPC ........... *B64D 13/08* (2013.01); *B64D 27/357* (2024.01); *B64D 33/08* (2013.01); *H01M 10/613* (2015.04);
    (Continued)

(58) Field of Classification Search
    CPC ... H01M 10/613; B64D 27/357; B64D 33/08; B64D 13/08; B64D 2013/0614
    (Continued)

(56) References Cited

U.S. PATENT DOCUMENTS 5,253,484 A * 10/1993 Corman ................. B64D 13/00
    62/239
9,950,798 B2 * 4/2018 Ng ......................... B64D 13/06
    (Continued)

FOREIGN PATENT DOCUMENTS

CN    110901925 A    3/2020
WO    2021/062305 A1    4/2021

OTHER PUBLICATIONS

Japanese Office Action dated Sep. 2, 2025 issued in corresponding Japanese application No. 2022-139604; English machine translation included (8 pages).

(Continued)

*Primary Examiner* — Vivek K Shirsat
(74) *Attorney, Agent, or Firm* — Rankin, Hill & Clark LLP

(57) ABSTRACT

A VTOL aircraft (moving object) includes: a first communication path allowing a cabin (passenger compartment) and a component compartment to communicate with each other; and a second communication path for opening the component compartment to the outside of a fuselage. A portion of air in the cabin flows through a first circulation path and returns to the cabin, and the remaining air in the cabin flows through the first communication path and is introduced into the component compartment. A portion of air in the component compartment flows through a second circulation path and returns to the component compartment, and the remaining air in the component compartment flows through the second communication path and is discharged to the outside of the fuselage.

8 Claims, 7 Drawing Sheets

(51) Int. Cl.
*B64D 27/357* (2024.01)
*B64D 33/08* (2006.01)
*H01M 10/613* (2014.01)

(52) U.S. Cl.
CPC ................ *B64D 2013/0614* (2013.01); *B64D 2013/0688* (2013.01)

(58) Field of Classification Search
USPC .......................................................... 454/71
See application file for complete search history.

(56) References Cited

U.S. PATENT DOCUMENTS

| | | | |
|---|---|---|---|
| 11,230,384 B2 * | 1/2022 | Lynn .................... | B60L 3/0046 |
| 2020/0010209 A1 * | 1/2020 | Bender ................. | B64D 31/16 |

OTHER PUBLICATIONS

Japanese Office Action dated Sep. 2, 2025 issued in corresponding Japanese application No. 2022-139607; English machine translation included (8 pages).

* cited by examiner

:FLOW OF AIR
:FLOW OF REFRIGERANT

:FLOW OF COOLANT

MOVING OBJECT

CROSS-REFERENCE TO RELATED APPLICATIONS

This application is based upon and claims the benefit of priority from Japanese Patent Applications No. 2022-139604 filed on Sep. 2, 2022 and No. 2022-139607 filed on Sep. 2, 2022, the contents all of which are incorporated herein by reference.

BACKGROUND OF THE INVENTION

Field of the Invention

The present invention relates to a moving object including an air conditioning system.

Description of the Related Art

U.S. Ser. No. 11/230,384 B2 discloses an aircraft (moving object) including a cabin air conditioning system. In this aircraft, the air in the cabin flows through a discharge flow path and is discharged to the outside of the aircraft. Avionics equipment is disposed on this discharge flow path. The avionics equipment is cooled by the air discharged from the cabin.

SUMMARY OF THE INVENTION

In the air conditioning system disclosed in U.S. Ser. No. 11/230,384 B2, if a failure occurs in the discharge flow path, the avionics equipment may not be able to be cooled.

Also, in the air conditioning system disclosed in U.S. Ser. No. 11/230,384 B2, the waste heat of the avionics equipment is discharged to the outside. The waste heat is preferably utilized effectively.

An object of the present invention is to solve the above-mentioned problem.

According to an aspect of the first invention, there is provided a moving object comprising: a passenger compartment configured to accommodate a person; a component compartment configured to accommodate a plurality of electric components electrically connected to an electric device; a first introduction opening and a second introduction opening each configured to introduce air from an outside to an inside of a fuselage; a first air conditioning system including a first circulation path connected to the passenger compartment, the first air conditioning system being configured to perform air conditioning of the passenger compartment by circulating, through a first path formed by the passenger compartment and the first circulation path, the air introduced to the inside of the fuselage from the first introduction opening; a second air conditioning system including a second circulation path connected to the component compartment, the second air conditioning system being configured to perform air conditioning of the component compartment by circulating, through a second path formed by the component compartment and the second circulation path, the air introduced to the inside of the fuselage from the second introduction opening; a first communication path configured to allow the passenger compartment and the component compartment to communicate with each other; and a second communication path configured to open the component compartment to the outside of the fuselage, wherein a portion of air in the passenger compartment flows through the first circulation path and returns to the passenger compartment, and remaining air in the passenger compartment flows through the first communication path and is introduced into the component compartment, and a portion of air in the component compartment flows through the second circulation path and returns to the component compartment, and remaining air in the component compartment flows through the second communication path and is discharged to the outside of the fuselage.

According to an aspect of the second invention, there is provided a moving object comprising: a passenger compartment configured to accommodate a person; a component compartment configured to accommodate a plurality of electric components electrically connected to an electric device; a first introduction opening and a second introduction opening each configured to introduce air from an outside to an inside of a fuselage; a first air conditioning system including a first circulation path connected to the passenger compartment, the first air conditioning system being configured to perform air conditioning of the passenger compartment by circulating, through a first path formed by the passenger compartment and the first circulation path, the air introduced to the inside of the fuselage from the first introduction opening; a second air conditioning system including a second circulation path connected to the component compartment, the second air conditioning system being configured to perform air conditioning of the component compartment by circulating, through a second path formed by the component compartment and the second circulation path, the air introduced to the inside of the fuselage from the second introduction opening; and a heat utilization circuit configured to heat the passenger compartment with waste heat from the component compartment, wherein the heat utilization circuit includes: an evaporator configured to absorb heat from the air flowing through the second circulation path; a condenser configured to release heat to the air flowing through the first circulation path; and a heat transfer flow path configured to transfer heat from the evaporator to the condenser by circulating a heating medium between the evaporator and the condenser.

According to the first invention, it is possible to continuously cool the electric components.

According to the second invention, the waste heat of the electric components can be effectively utilized without being wasted.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

[1. Configuration of VTOL Aircraft 10]

Figure 1:
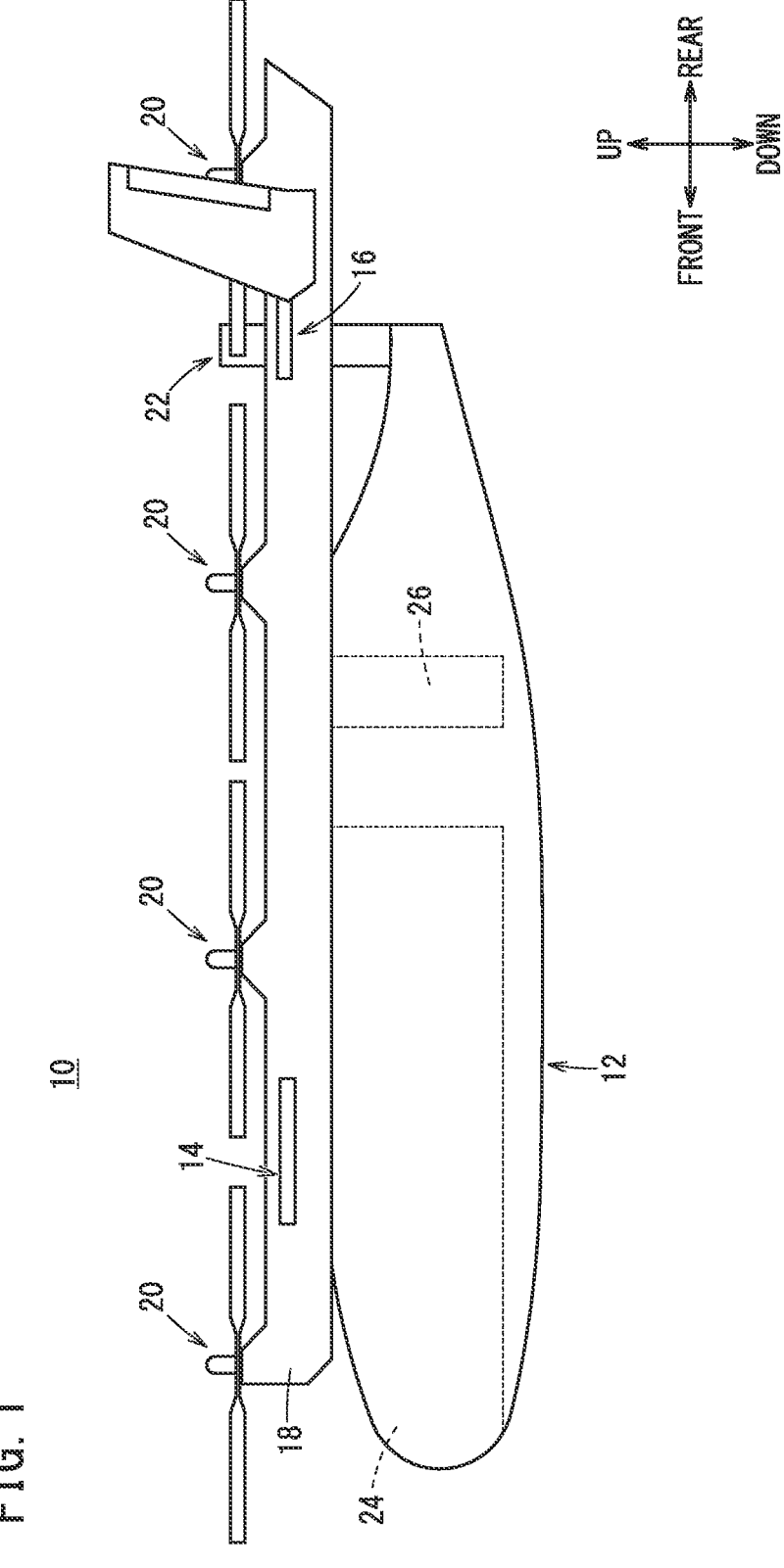
FIG. 1 is a left side view of a VTOL aircraft.

FIG. 1 is a left side view of a VTOL aircraft 10. The VTOL aircraft 10 (moving object) is, for example, an electric vertical take-off and landing aircraft, a so-called eVTOL aircraft. The VTOL aircraft 10 includes a fuselage 12, a front wing 14, a rear wing 16, left and right booms 18, eight VTOL rotors 20, and left and right cruise rotors 22. In FIG. 1, only the left boom 18 out of the left and right booms 18 is shown. Further, in FIG. 1, only four of the eight VTOL rotors 20 are shown. Furthermore, in FIG. 1, only the left cruise rotor 22 out of the left and right cruise rotors 22 is shown. The VTOL aircraft 10 includes one or more batteries 68 (FIG. 3) and one or more generators (not shown) as power sources for flight.

The front wing 14 is connected to a front portion of the fuselage 12. The rear wing 16 is connected to a rear portion of the fuselage 12. The front wing 14 and the rear wing 16 generate lift as the VTOL aircraft 10 moves forward.

Each of the two booms 18 is supported by the front wing 14 and the rear wing 16. One boom 18 of the two booms 18 is disposed on the left side of the fuselage 12. The other boom 18 of the two booms 18 is disposed on the right side of the fuselage 12. Each boom 18 extends in the front-rear direction.

Four VTOL rotors 20 are arranged on each boom 18 sequentially toward the rear. Each VTOL rotor 20 is used during takeoff, during vertical climb, during transition from climb to cruise, during transition from cruise to descent, during vertical descent, during landing, and during hovering. Each VTOL rotor 20 generates thrust in the vertical direction.

Two cruise rotors 22 are disposed on the rear wing 16 so as to be arranged side by side in the left-right direction. Each cruise rotor 22 is used during cruise, during transition from climb to cruise, and during transition from cruise to descent. Each cruise rotor 22 generates thrust in the horizontal direction.

A cabin 24 and a component compartment 26 are provided inside the fuselage 12. The cabin 24 is arranged forward of the component compartment 26. However, the arrangement of the cabin 24 and the component compartment 26 is not limited thereto. The cabin 24 is wider than the component compartment 26.

The cabin 24 can accommodate a plurality of passengers. On the other hand, the component compartment 26 accommodates a plurality of electric components in advance. The electric components are electrically connected to electric devices mounted on the VTOL aircraft 10. In the present embodiment, the electric devices are power sources and motors of the respective rotors (the VTOL rotors 20 and the cruise rotors 22). Further, the electric components are circuit components connected to the motors. The circuit components include components for distributing electric power from one or more power sources to the motors, such as harnesses, switches, and contactors. The electric components accommodated in the component compartment 26 may be other components, for example, circuit components related to avionics equipment or the like. Further, the electric components accommodated in the component compartment 26 may be batteries other than the batteries 68 described later. It should be noted that the component compartment 26 may not be a room, but may be a housing that accommodates the electric components. The circuit components generate heat when energized. The heat of the circuit components is used for heating the cabin 24.

[2. Flow of Air Inside VTOL Aircraft 10]

Figure 2:
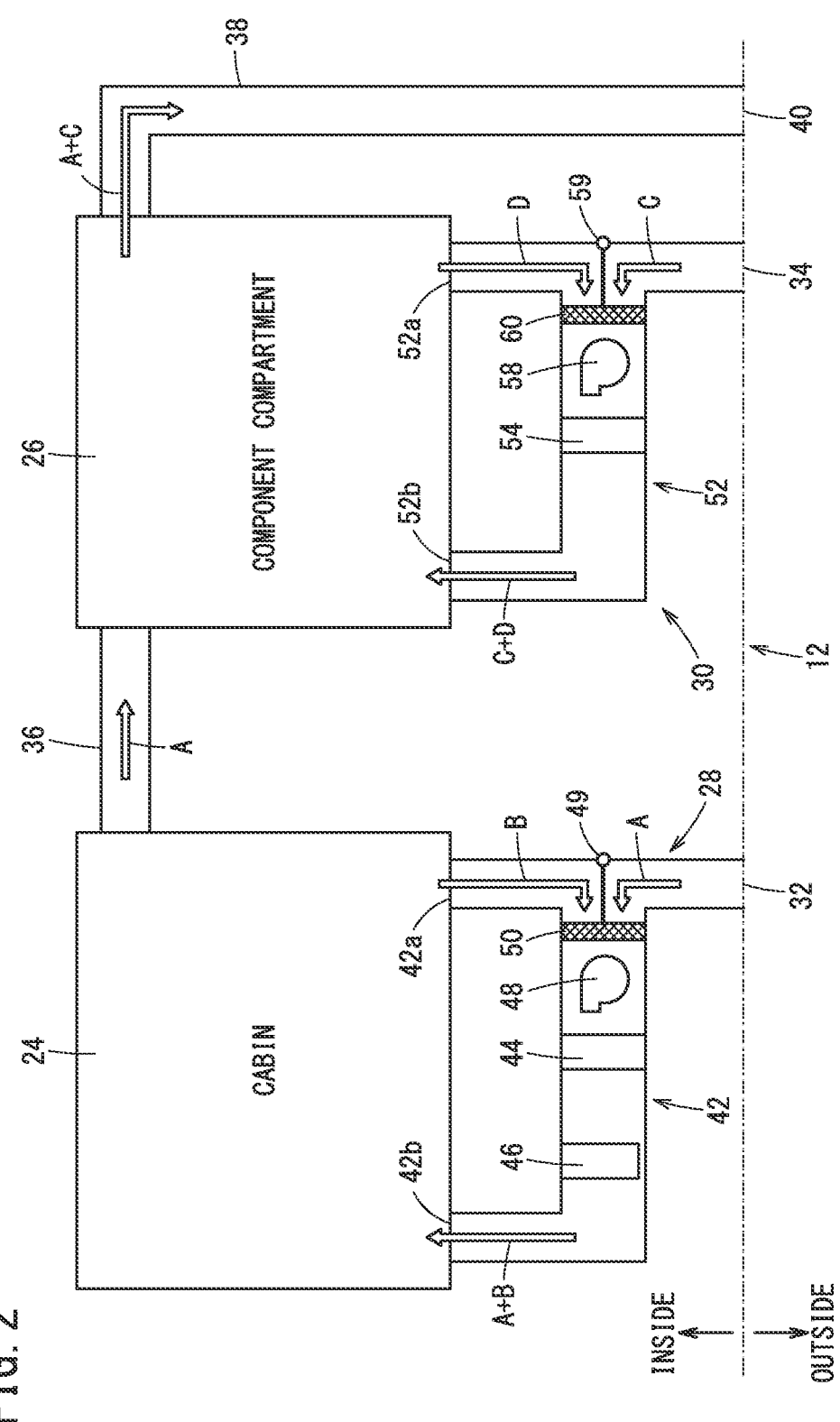
FIG. 2 is a diagram showing the flow of air inside the VTOL aircraft.

FIG. 2 is a diagram showing the flow of air inside the VTOL aircraft 10. Specifically, FIG. 2 shows the flow of air flowing into and out of the cabin 24, and the flow of air flowing into and out of the component compartment 26. The VTOL aircraft 10 includes a first air conditioning system 28, a second air conditioning system 30, a first introduction opening 32, a second introduction opening 34, a first communication path 36, a second communication path 38, and an exhaust opening 40. The first air conditioning system 28 and the second air conditioning system 30 are so-called HVAC systems.

The first air conditioning system 28 performs air conditioning of the cabin 24. The first air conditioning system 28 includes a first circulation path 42 that includes the cabin 24. An inlet 42*a* and an outlet 42*b* of the first circulation path 42 are formed in the cabin 24. A first evaporator 44, an internal condenser 46, a first blower fan 48, and a first filter 50 are disposed on the first circulation path 42. The first introduction opening 32 is connected to a portion of the first circulation path 42 that is located downstream of the inlet 42*a* and upstream of the first blower fan 48 and the first filter 50. The first introduction opening 32 is formed in an outer peripheral portion of the fuselage 12 and is configured to introduce air (outside air) from the outside to the inside of the fuselage 12.

A first door 49 is provided at a merging portion in the first circulation path 42 where the air (inside air) flowing from the cabin 24 merges with the air (outside air) flowing from the first introduction opening 32. The first door 49 adjusts, according to its position, a ratio between the inside air and the outside air in the air supplied to the cabin 24. An actuator for changing the position of the first door 49 is controlled by a controller (not shown).

The air flowing through the first circulation path 42 is cooled by passing through the first evaporator 44. In addition, the air flowing through the first circulation path 42 is heated by passing through the internal condenser 46. In the first air conditioning system 28, the amount of air passing through the internal condenser 46 can be adjusted. The cooled air and the heated air are supplied to the cabin 24. As a result, air conditioning (cooling and heating) of the cabin 24 is performed. The air conditioning of the cabin 24 will be described in detail in [3] below.

The second air conditioning system 30 performs air conditioning of the component compartment 26. The second air conditioning system 30 includes a second circulation path 52 that includes the component compartment 26. An inlet 52*a* and an outlet 52*b* of the second circulation path 52 are formed in the component compartment 26. A second evaporator 54, a second blower fan 58, and a second filter 60 are disposed on the second circulation path 52. The second introduction opening 34 is connected to a portion of the second circulation path 52 that is located downstream of the inlet 52*a* and upstream of the second blower fan 58 and the second filter 60. The second introduction opening 34 is formed in the outer peripheral portion of the fuselage 12 and is configured to introduce air (outside air) from the outside to the inside of the fuselage 12.

A second door 59 is provided at a merging portion in the second circulation path 52 where the air (inside air) flowing from the component compartment 26 merges with the air (outside air) flowing from the second introduction opening 34. The second door 59 adjusts, according to its position, a ratio between the inside air and the outside air in the air supplied to the component compartment 26. An actuator for changing the position of the second door 59 is controlled by a controller (not shown).

The air flowing through the second circulation path 52 is cooled by passing through the second evaporator 54. The cooled air is supplied to the component compartment 26. As a result, air conditioning (cooling) of the component compartment 26 is performed. Since it is not necessary to heat the electric components, heating of the component compartment 26 is not necessary. The air conditioning of the component compartment 26 will be described in detail in [3] below.

Note that the first introduction opening 32 and the second introduction opening 34 may be formed at the same position. In this case, the flow path connected to the first introduction opening 32 (or the second introduction opening 34) is branched into two, and one branch flow path is connected to the first air conditioning system 28, and the other branch flow path is connected to the second air conditioning system 30.

The first communication path 36 is provided between the cabin 24 and the component compartment 26, and allows the cabin 24 and the component compartment 26 to communicate with each other. The first communication path 36 allows air to flow therethrough. The first communication path 36 may be provided in plurality.

The second communication path 38 is provided between the component compartment 26 and the exhaust opening 40, and allows the component compartment 26 and the exhaust opening 40 to communicate with each other. That is, the component compartment 26 is open to the outside of the aircraft through the second communication path 38. The second communication path 38 allows air to flow therethrough. The second communication path 38 may be provided in plurality. The exhaust opening 40 is formed in the outer peripheral portion of the fuselage 12. The exhaust opening 40 may be provided in plurality.

With the operation of the first blower fan 48, external air (outside air) flows into the first circulation path 42 from the first introduction opening 32. The amount of this air is referred to as "A". Further, with the operation of the first blower fan 48, a portion of the air (inside air) in the cabin 24 flows into the first circulation path 42 from the inlet 42a, flows through the first circulation path 42, and flows into the cabin 24 from the outlet 42b. The amount of this air, that is, the amount of the air flowing from the inlet 42a and returning to the cabin 24 via the first circulation path 42 is referred to as "B".

In this case, as shown in FIG. 2, an amount A+B of air flows into the cabin 24 from the outlet 42b of the first circulation path 42. The amount of air in the cabin 24 is constant. That is, when the amount A+B of air flows into the cabin 24, the same amount of air flows out of the cabin 24. The amount B of air, which is a portion of the air flowing out of the cabin 24, flows into the first circulation path 42 from the inlet 42a as described above. As a result, the remaining air, that is, the amount A of air flows into the first communication path 36. This air flows through the first communication path 36 and flows into the component compartment 26.

With the operation of the second blower fan 58, external air (outside air) flows into the second circulation path 52 from the second introduction opening 34. The amount of this air is referred to as "C". Further, with the operation of the second blower fan 58, a portion of the air (inside air) in the component compartment 26 flows into the second circulation path 52 from the inlet 52a, flows through the second circulation path 52, and flows into the component compartment 26 from the outlet 52b. The amount of this air, that is, the amount of the air flowing from the inlet 52a and returning to the component compartment 26 via the second circulation path 52 is referred to as "D".

In this case, as shown in FIG. 2, an amount C+D of air flows into the component compartment 26 from the outlet 52b of the second circulation path 52. Further, as described above, the amount A of air flows into the component compartment 26 from the first communication path 36. The amount of air in the component compartment 26 is constant. That is, when an amount A+C+D of air flows into the component compartment 26, the same amount of air flows out of the component compartment 26. The amount D of air, which is a portion of the air flowing out of the component compartment 26, flows into the second circulation path 52 from the inlet 52a as described above. As a result, the remaining air, that is, an amount A+C of air flows into the second communication path 38. This air flows through the second communication path 38 and is discharged to the outside from the exhaust opening 40.

In the present embodiment, air does not flow through the first communication path 36 in the opposite direction. That is, in the present embodiment, air does not flow from the component compartment 26 toward the first communication path 36. The reason for this is as follows.

External air flows into the cabin 24 from the first introduction opening 32. Further, the cabin 24 is not open to the outside of the VTOL aircraft 10. Meanwhile, in the same manner as in the cabin 24, external air flows into the component compartment 26 from the second introduction opening 34. However, unlike the cabin 24, the component compartment 26 is open to the outside of the VTOL aircraft 10 by the second communication path 38 and the exhaust opening 40. That is, a place to which the amount of air corresponding to the amount of air flowing into the component compartment 26 escapes is the outside of the VTOL aircraft 10. On the other hand, a place to which the amount of air corresponding to the amount of air flowing into the cabin 24 escapes is the first communication path 36. Therefore, in the first communication path 36, air can flow only from the cabin 24 to the component compartment 26.

The electric components in the component compartment 26 are cooled by the air flowing in from the outlet 52b of the second circulation path 52. Further, the electric components in the component compartment 26 are cooled by the air flowing in from the first communication path 36. In this manner, in the present embodiment, two cooling systems (the second air conditioning system 30 and the first communication path 36) for cooling the electric components are provided. Even if a failure occurs in the second air conditioning system 30, the electric components are cooled by the air flowing from the cabin 24. Further, even if a failure occurs in the first air conditioning system 28 or the first communication path 36, the electric components are cooled by the function of the second air conditioning system 30. Therefore, according to the present embodiment, it is possible to continuously cool the electric components.

[3. Fluid Circuit Inside VTOL Aircraft 10]

Figure 3:
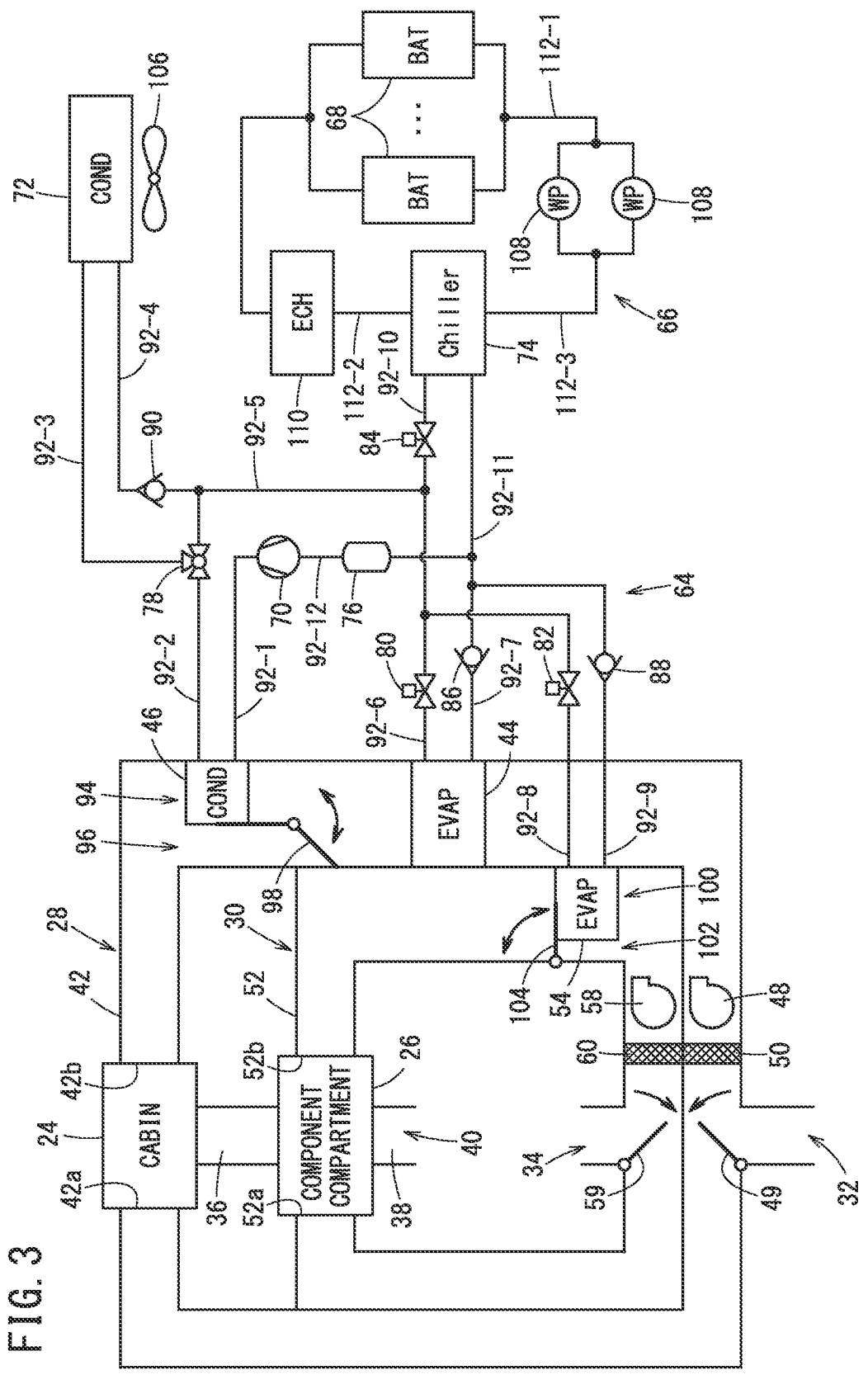
FIG. 3 is a diagram showing a first air conditioning system, a second air conditioning system, a heat utilization circuit, and a cooling circuit.

FIG. 3 is a diagram showing the first air conditioning system 28, the second air conditioning system 30, a heat utilization circuit 64, and a cooling circuit 66. The heat utilization circuit 64 can heat the cabin 24 with waste heat from at least one of the component compartment 26 or the battery 68. The cooling circuit 66 can cool a plurality of the batteries 68. The plurality of batteries 68 are power sources of the plurality of rotors (the VTOL rotors 20 and the cruise rotors 22).

The heat utilization circuit 64 includes a compressor 70, the internal condenser 46, an external condenser 72, the first evaporator 44, the second evaporator 54, a chiller 74, an accumulator 76, a plurality of valves, and a plurality of flow paths. The respective components of the heat utilization circuit 64 form circulation paths for a refrigerant (heating medium). The respective components of the heat utilization circuit 64 are connected as follows.

A discharge port of the compressor 70 and an inflow port of the internal condenser 46 are connected by a first flow path 92-1. An outflow port of the internal condenser 46 and an inflow port of a three-way valve 78 are connected by a second flow path 92-2. A first outflow port of the three-way valve 78 and an inflow port of the external condenser 72 are connected by a third flow path 92-3. An outflow port of the external condenser 72 and a primary port of a third check valve 90 are connected by a fourth flow path 92-4. A secondary port of the third check valve 90, a second outflow port of the three-way valve 78, an inflow port of a first expansion valve 80, an inflow port of a second expansion valve 82, and an inflow port of a third expansion valve 84 are connected by a fifth flow path 92-5. An outflow port of the first expansion valve 80 and an inflow port of the first evaporator 44 are connected by a sixth flow path 92-6. An outflow port of the first evaporator 44 and a primary port of a first check valve 86 are connected by a seventh flow path 92-7. An outflow port of the second expansion valve 82 and an inflow port of the second evaporator 54 are connected by an eighth flow path 92-8. An outflow port of the second evaporator 54 and a primary port of a second check valve 88 are connected by a ninth flow path 92-9. An outflow port of the third expansion valve 84 and a first inflow port of the chiller 74 are connected by a tenth flow path 92-10. A secondary port of the first check valve 86, a secondary port of the second check valve 88, a first outflow port of the chiller 74, and a primary port of the accumulator 76 are connected by an eleventh flow path 92-11. A secondary port of the accumulator 76 and a suction port of the compressor 70 are connected by a twelfth flow path 92-12.

As described above, the first evaporator 44 and the internal condenser 46 of the heat utilization circuit 64 are disposed on the first circulation path 42 of the first air conditioning system 28. In addition, as described above, the second evaporator 54 of the heat utilization circuit 64 is disposed on the second circulation path 52 of the second air conditioning system 30.

A first main path 94 and a first bypass path 96 are formed in a part of the first circulation path 42 of the first air conditioning system 28. The first bypass path 96 bypasses the first main path 94. The first blower fan 48 is disposed upstream of the first main path 94 and the first bypass path 96. The first evaporator 44 is disposed downstream of the first blower fan 48 and upstream of the first main path 94 and the first bypass path 96. The internal condenser 46 is disposed on the first main path 94. A first flap 98 is provided in the vicinity of the first main path 94 and the first bypass path 96. The first flap 98 adjusts the opening degree of the first main path 94 and the opening degree of the first bypass path 96. An actuator for opening and closing the first flap 98 is controlled by a controller (not shown).

A second main path 100 and a second bypass path 102 are formed in a part of the second circulation path 52 of the second air conditioning system 30. The second blower fan 58 is disposed upstream of the second main path 100 and the second bypass path 102. The second bypass path 102 bypasses the second main path 100. The second evaporator 54 is disposed on the second main path 100. A second flap 104 is provided in the vicinity of the outlet of the second bypass path 102. The second flap 104 is opened and closed by a pressure difference between the upstream side and the downstream side of the second bypass path 102 (and the second evaporator 54). The second flap 104 basically closes the second bypass path 102. When the second evaporator 54 freezes and becomes clogged, the pressure on the upstream side of the second bypass path 102 (and the second evaporator 54) becomes higher than the pressure on the downstream side of the second bypass path 102 (and the second evaporator 54). In this state, the second flap 104 receives the pressure on the upstream side of the second bypass path 102 and opens the second bypass path 102.

The compressor 70 sucks the low-temperature and low-pressure gaseous refrigerant from the accumulator 76. The compressor 70 compresses the sucked refrigerant. As a result, the low-temperature and low-pressure gaseous refrigerant changes into a high-temperature and high-pressure gaseous refrigerant. The compressor 70 discharges the refrigerant.

The internal condenser 46 includes a conduit through which the refrigerant compressed to high temperature and high pressure by the compressor 70 flows. The refrigerant flowing through the conduit of the internal condenser 46 releases heat to the air flowing through the first circulation path 42. As a result, the high-temperature and high-pressure gaseous refrigerant changes into a low-temperature and high-pressure liquid refrigerant.

The three-way valve 78 can cause the refrigerant flowing in from the inflow port thereof to flow out from either the first outflow port or the second outflow port thereof. Switching of the outflow direction of the refrigerant in the three-way valve 78 is controlled by a controller (not shown).

The external condenser 72 is disposed outside the first circulation path 42 and the second circulation path 52. External air (outside air) is delivered to the external condenser 72 by a fan 106. The external condenser 72 includes a conduit through which the refrigerant flowing out of the internal condenser 46 flows. The refrigerant flowing through the conduit of the external condenser 72 releases heat to the outside air. As a result, the gaseous refrigerant that has not been liquefied in the internal condenser 46 changes into a low-temperature and high-pressure liquid refrigerant.

Each of the first expansion valve 80, the second expansion valve 82, and the third expansion valve 84 sprays and expands the refrigerant flowing out of the internal condenser 46 or the external condenser 72. The sprayed refrigerant is rapidly vaporized and absorbs heat from the surroundings. In each expansion valve, communication and disconnection between the inflow port and the outflow port can be switched. This switching is controlled by a controller (not shown).

The first evaporator 44 includes a conduit through which the refrigerant sprayed by the first expansion valve 80 flows. The refrigerant flowing through the conduit of the first evaporator 44 absorbs heat from the air flowing through the first circulation path 42. As a result, the first evaporator 44 cools the air flowing through the first circulation path 42. Further, the first evaporator 44 dehumidifies the air flowing through the first circulation path 42.

The second evaporator 54 includes a conduit through which the refrigerant sprayed by the second expansion valve 82 flows. The refrigerant flowing through the conduit of the second evaporator 54 absorbs heat from the air flowing through the second circulation path 52. As a result, the second evaporator 54 cools the air flowing through the second circulation path 52. Further, the second evaporator 54 dehumidifies the air flowing through the second circulation path 52.

The accumulator 76 stores the gaseous refrigerant and the liquid refrigerant flowing out of at least one of the first evaporator 44, the second evaporator 54, or the chiller 74. The gaseous refrigerant is sucked into the compressor 70.

Each of the check valves (the first check valve 86, the second check valve 88, and the third check valve 90) allows the refrigerant to flow from the primary port to the secondary port and does not allow the refrigerant to flow from the secondary port to the primary port.

The cooling circuit 66 includes two water pumps 108, a heater 110, the chiller 74, and a plurality of cooling flow paths. The respective components of the cooling circuit 66 form circulation paths for a coolant. The respective components of the cooling circuit 66 are connected as follows.

A discharge port of each water pump 108 and an inflow port of the heater 110 are connected by a first cooling flow path 112-1. An outflow port of the heater 110 and a second inflow port of the chiller 74 are connected by a second cooling flow path 112-2. A second outflow port of the chiller 74 and a suction port of each water pump 108 are connected by a third cooling flow path 112-3.

Each water pump 108 sucks the coolant flowing through the third cooling flow path 112-3, and discharges the coolant to the first cooling flow path 112-1. A part of the first cooling flow path 112-1 is provided around each battery 68. The coolant flowing through the first cooling flow path 112-1 can absorb heat from each battery 68 by flowing around the battery 68. Turning on and off of the heater 110 is controlled by a controller (not shown).

The chiller 74 includes a first conduit through which the refrigerant flowing in from the tenth flow path 92-10 of the heat utilization circuit 64 flows. In addition, the chiller 74 includes a second conduit through which the coolant flowing in from the second cooling flow path 112-2 of the cooling circuit 66 flows. Inside the chiller 74, heat exchange is performed between the refrigerant in the first conduit and the coolant in the second conduit. The refrigerant absorbs heat from the coolant. As a result, the temperature of the refrigerant rises. On the other hand, the coolant releases heat to the refrigerant. As a result, the temperature of the coolant decreases.

[4. Heat Transfer Inside VTOL Aircraft 10]

[4-1. Cooling of Cabin 24 and Component Compartment 26]

Figure 4:
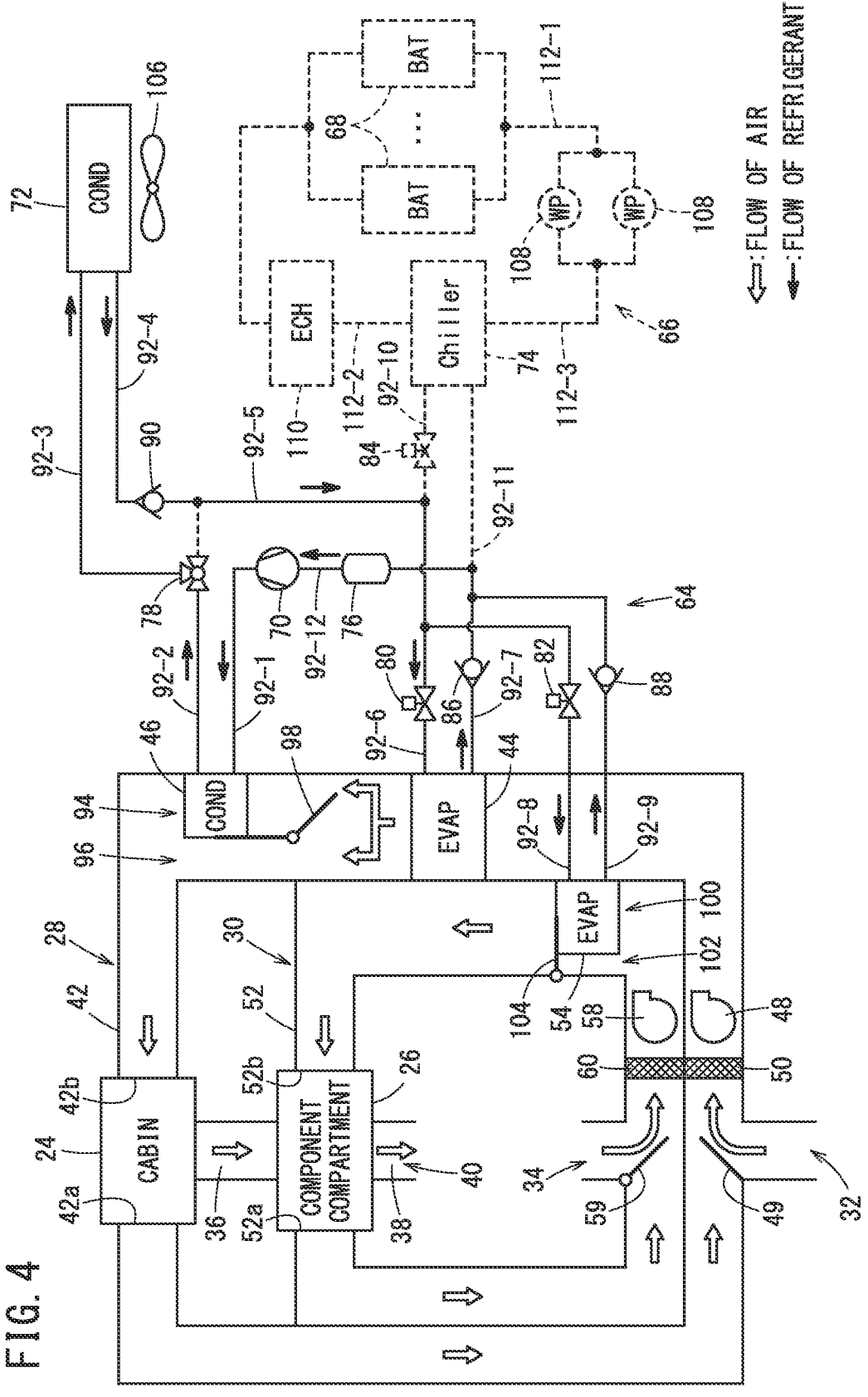
FIG. 4 is a diagram showing the state of the heat utilization circuit and the state of each air conditioning system during cooling of a cabin and a component compartment.

FIG. 4 is a diagram showing the state of the heat utilization circuit 64 and the state of each air conditioning system during cooling of the cabin 24 and the component compartment 26. Here, a description of the coolant flowing through the cooling circuit 66 will be omitted. In FIG. 4, portions to be described below are indicated by solid lines, and portions whose description will be omitted are indicated by broken lines. The cabin 24 is cooled and heated, whereas the component compartment 26 is constantly cooled.

During cooling of the cabin 24 and the component compartment 26, the first expansion valve 80 and the second expansion valve 82 are opened. Further, in the three-way valve 78, the first outflow port is opened and the second outflow port is closed. Therefore, the second flow path 92-2 and the third flow path 92-3 communicate with each other. In addition, in the first circulation path 42, the position of the first flap 98 is adjusted to fully open the first bypass path 96.

On the other hand, the opening degree of the first main path 94 is adjusted in accordance with the set temperature of the cabin 24.

The refrigerant accumulated in the accumulator 76 is sucked into and compressed by the compressor 70. The refrigerant discharged from the compressor 70 flows through the internal condenser 46 and the external condenser 72. A portion of the refrigerant flowing out of the external condenser 72 flows through the first expansion valve 80 and the first evaporator 44 and returns to the accumulator 76. Further, a portion of the refrigerant flowing out of the external condenser 72 flows through the second expansion valve 82 and the second evaporator 54 and returns to the accumulator 76.

The air introduced into the first circulation path 42 from the cabin 24 and the first introduction opening 32 in response to the operation of the first blower fan 48 passes through the first evaporator 44. A portion of the air passes through first bypass path 96. Further, the remaining air passes through the internal condenser 46 of the first main path 94. In the first evaporator 44, the air releases heat to the refrigerant, and the refrigerant absorbs heat from the air. In the internal condenser 46, the air absorbs heat from the refrigerant and the refrigerant releases heat to the air. As a result, the air cooled by the first evaporator 44 and the air heated by the internal condenser 46 are mixed and delivered from the outlet 42*b* of the first circulation path 42 to the cabin 24. The temperature of the mixed air changes according to the opening degree of the first main path 94.

The air introduced from the component compartment 26 and the second introduction opening 34 into the second circulation path 52 in response to the operation of the second blower fan 58 passes through the second evaporator 54. In the second evaporator 54, the air releases heat to the refrigerant, and the refrigerant absorbs heat from the air. As a result, the air cooled by the second evaporator 54 is delivered from the outlet 52*b* of the second circulation path 52 to the component compartment 26. When the second evaporator 54 is clogged due to freezing or the like, the second flap 104 opens. Thus, the air bypassing the second evaporator 54 is delivered from the outlet 52*b* of the second circulation path 52 to the component compartment 26.

The refrigerant flows from the internal condenser 46 into the external condenser 72 and releases heat to the external air in the external condenser 72. Thus, the refrigerant is further cooled.

[4-2. Cooling of Batteries 68]

Figure 5:
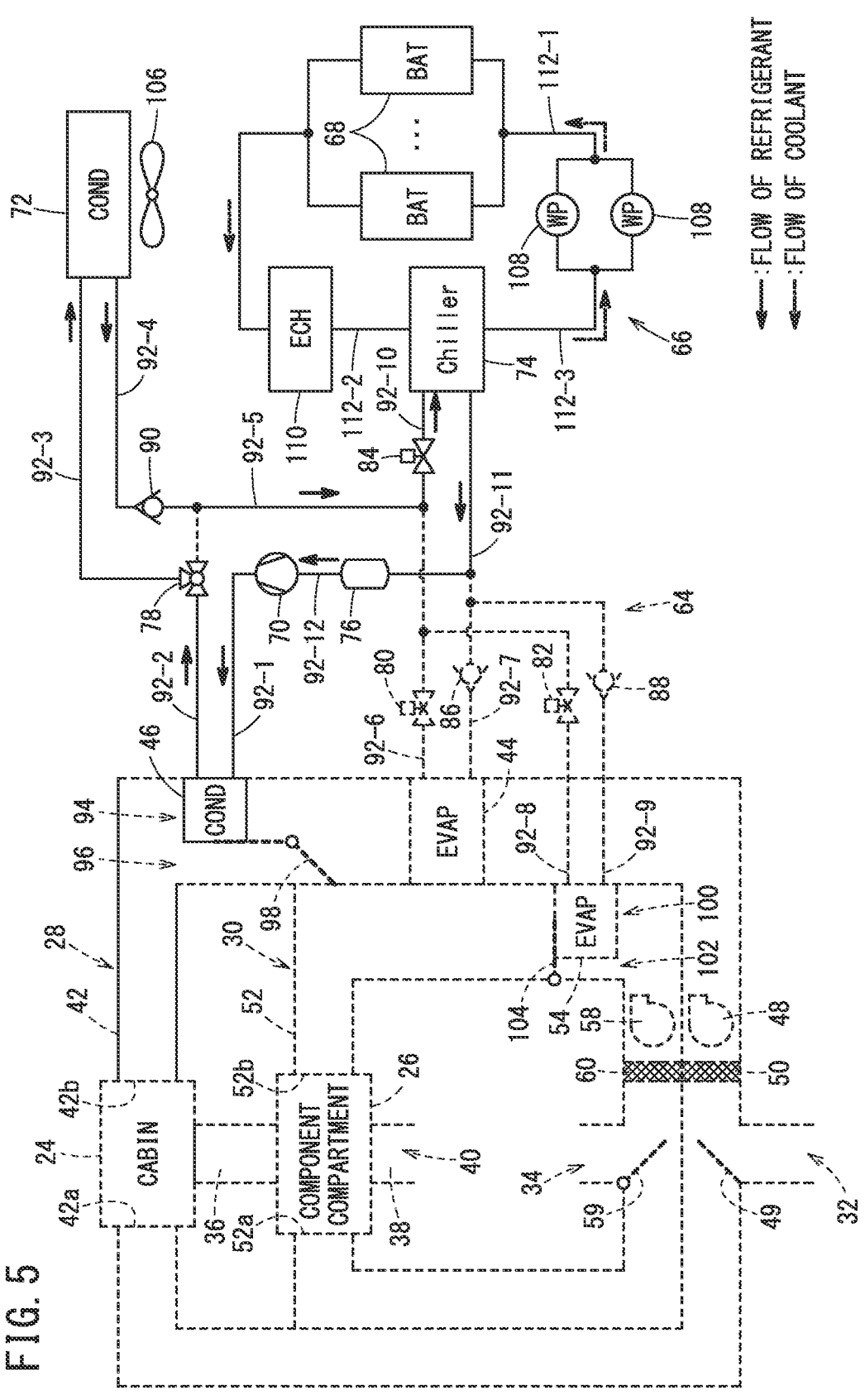
FIG. 5 is a diagram showing the state of the heat utilization circuit and the state of the cooling circuit during cooling of batteries.

FIG. 5 is a diagram showing the state of the heat utilization circuit 64 and the state of the cooling circuit 66 during cooling of the batteries 68. Here, description of the refrigerant flowing through each evaporator of the heat utilization circuit 64 and description of the air flowing through each air conditioning system will be omitted. In FIG. 5, portions to be described below are indicated by solid lines, and portions whose description will be omitted are indicated by broken lines.

When the batteries 68 are cooled, the third expansion valve 84 is opened. Further, in the three-way valve 78, the first outflow port is opened and the second outflow port is closed. Therefore, the second flow path 92-2 and the third flow path 92-3 communicate with each other. Further, the heater 110 is turned off.

The refrigerant accumulated in the accumulator 76 is sucked into and compressed by the compressor 70. The refrigerant discharged from the compressor 70 flows through the internal condenser 46 and the external condenser 72. A portion of the refrigerant flowing out of the external condenser 72 flows through the third expansion valve 84 and the chiller 74 and returns to the accumulator 76.

In response to the operation of the water pump 108, the coolant is circulated through the cooling circuit 66. In the chiller 74, the coolant releases heat to the refrigerant in the heat utilization circuit 64, and the refrigerant in the heat utilization circuit 64 absorbs heat from the coolant. The coolant absorbs heat from the batteries 68, and the batteries 68 release heat to the coolant. As a result, the batteries 68 are cooled.

The refrigerant in the heat utilization circuit 64 flows from the internal condenser 46 into the external condenser 72, and releases heat to the external air in the external condenser 72. As a result, the refrigerant is cooled.

[4-3. Heating of Batteries 68]

Figure 6:
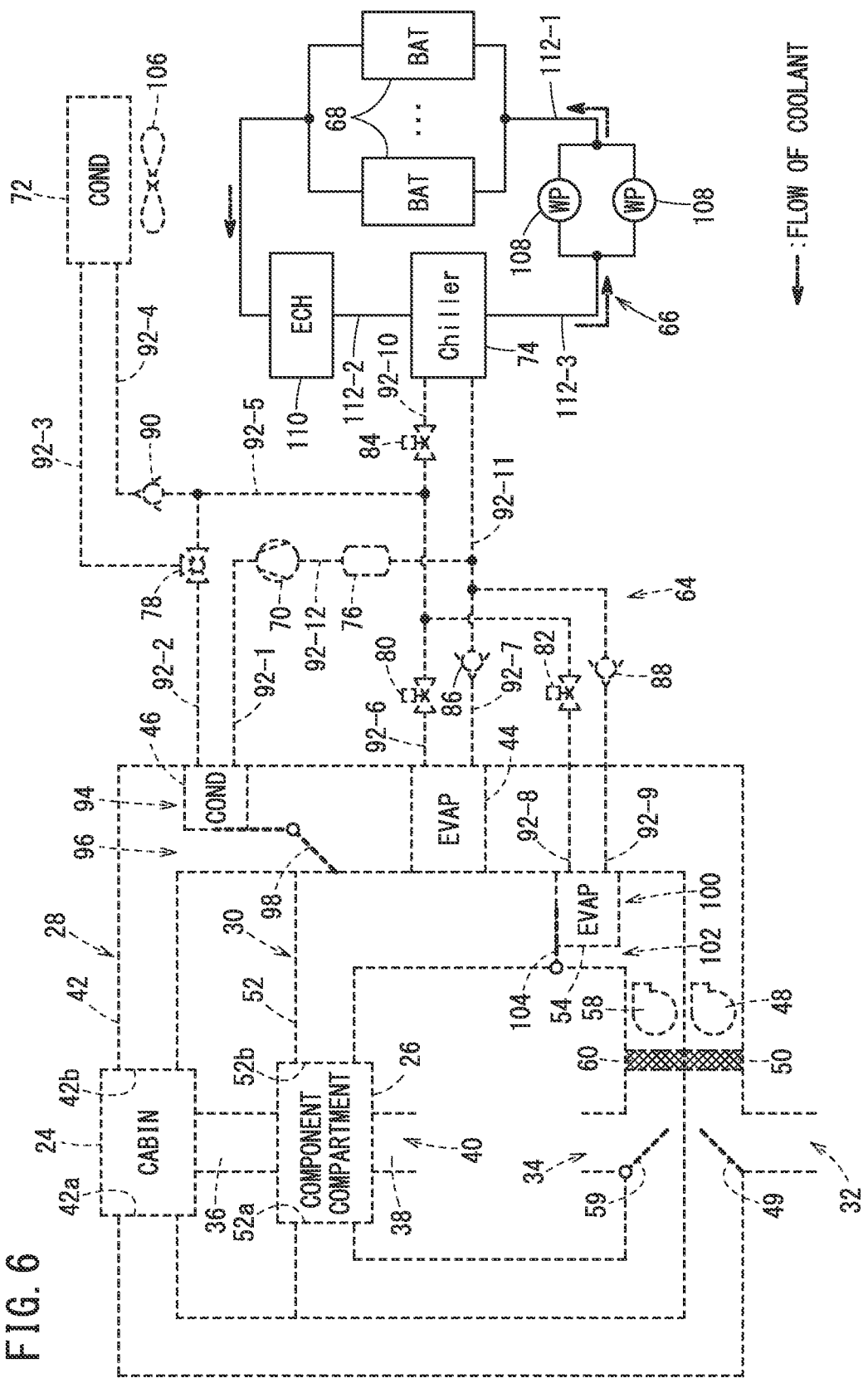
FIG. 6 shows the state of the cooling circuit during heating of the batteries.

FIG. 6 is a diagram showing the state of the cooling circuit 66 during heating of the batteries 68. In FIG. 6, portions to be described below are indicated by solid lines, and portions whose description will be omitted are indicated by broken lines. When the batteries 68 are heated, the third expansion valve 84 is closed. As a result, the cooling circuit 66 is thermally isolated from the heat utilization circuit 64. The heater 110 is turned on.

In response to the operation of the water pump 108, the coolant is circulated through the cooling circuit 66. The coolant is heated by the heater 110. The coolant releases heat to the batteries 68, and the batteries 68 absorb heat from the coolant. As a result, the batteries 68 are heated.

[4-4. Heating of Cabin 24 with Waste Heat of Batteries 68]

Figure 7:
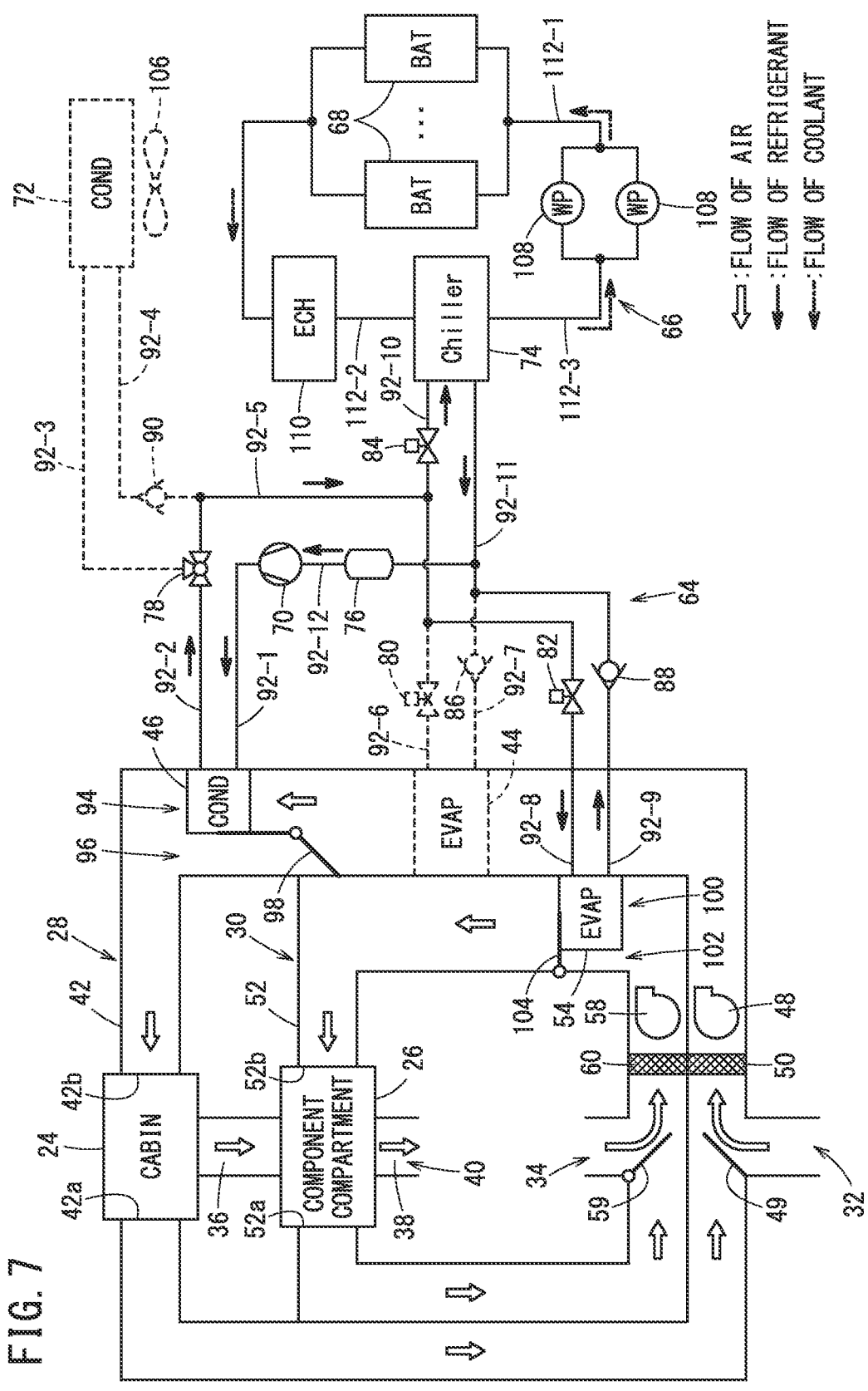
FIG. 7 is a diagram showing the state of the heat utilization circuit, the state of the cooling circuit, and the state of each air conditioning system during heating of the cabin.

FIG. 7 is a diagram showing the state of the heat utilization circuit 64, the state of the cooling circuit 66, and the state of each air conditioning system during heating of the cabin 24. In FIG. 7, portions to be described below are indicated by solid lines, and portions whose description will be omitted are indicated by broken lines.

When the cabin 24 is heated, at least one of the second expansion valve 82 or the third expansion valve 84 is opened. On the other hand, the first expansion valve 80 is closed. Further, in the three-way valve 78, the second outflow port is opened and the first outflow port is closed. Therefore, the second flow path 92-2 and the fifth flow path 92-5 communicate with each other. Further, in the first circulation path 42, the position of the first flap 98 is adjusted to close the first bypass path 96. On the other hand, the first main path 94 is fully opened.

The refrigerant accumulated in the accumulator 76 is sucked into and compressed by the compressor 70. The refrigerant discharged from the compressor 70 flows through the internal condenser 46. A portion of the refrigerant flowing out of the internal condenser 46 flows through the second expansion valve 82 and the second evaporator 54 and returns to the accumulator 76. Further, a portion of the refrigerant flowing out of the internal condenser 46 flows through the third expansion valve 84 and the chiller 74 and returns to the accumulator 76.

The refrigerant flowing through the heat utilization circuit 64 absorbs, in the second evaporator 54, waste heat of the electric components from the air flowing through the second circulation path 52. Further, the refrigerant flowing through the heat utilization circuit 64 absorbs, in the chiller 74, waste heat of the batteries 68 from the coolant flowing through the cooling circuit 66.

The air introduced into the first circulation path 42 from the cabin 24 and the first introduction opening 32 in response to the operation of the first blower fan 48 passes through the internal condenser 46 of the first main path 94. In the internal condenser 46, the air absorbs heat from the refrigerant and the refrigerant releases heat to the air. In the internal condenser 46, the waste heat of the electric components and the waste heat of the batteries 68 are transferred from the refrigerant to the air. As a result, the air heated by the internal condenser 46 is delivered from the outlet 42b of the first circulation path 42 to the cabin 24. In this manner, according to the present embodiment, the waste heat of the electric components and the waste heat of the batteries 68 can be effectively utilized.

[5. Inventions Obtained from Embodiment]

The inventions that can be grasped from the above embodiment will be described below.

According to an aspect of the first invention, provided is the moving object (10) including: the passenger compartment (24) configured to accommodate a person; the component compartment (26) configured to accommodate the plurality of electric components electrically connected to the electric device; the first introduction opening (32) and the second introduction opening (34) each configured to introduce air from the outside to the inside of the fuselage (12); the first air conditioning system (28) including the first circulation path (42) connected to the passenger compartment, the first air conditioning system being configured to perform air conditioning of the passenger compartment by circulating, through the first path formed by the passenger compartment and the first circulation path, the air introduced to the inside of the fuselage from the first introduction opening; the second air conditioning system (30) including the second circulation path (52) connected to the component compartment, the second air conditioning system being configured to perform air conditioning of the component compartment by circulating, through the second path formed by the component compartment and the second circulation path, the air introduced to the inside of the fuselage from the second introduction opening; the first communication path (36) configured to allow the passenger compartment and the component compartment to communicate with each other; and the second communication path (38) configured to open the component compartment to the outside of the fuselage, wherein a portion of the air in the passenger compartment flows through the first circulation path and returns to the passenger compartment, and the remaining air in the passenger compartment flows through the first communication path and is introduced into the component compartment, and a portion of the air in the component compartment flows through the second circulation path and returns to the component compartment, and the remaining air in the component compartment flows through the second communication path and is discharged to the outside of the fuselage.

According to the above configuration, two cooling systems (the second air conditioning system and the first communication path) for cooling the electric components in the component compartment are provided. Even if a failure occurs in the second air conditioning system, the electric components are cooled by the air flowing from the passenger compartment. Further, even if a failure occurs in the first air conditioning system or the first communication path, the electric components are cooled by the function of the second air conditioning system. Therefore, according to the present embodiment, it is possible to continuously cool the electric components.

In the above aspect, the moving object may further include the heat utilization circuit (64) configured to heat the passenger compartment with waste heat from the component compartment, and the heat utilization circuit may include the evaporator (54) configured to absorb heat from the air flowing through the second circulation path, the condenser

(46) configured to release heat to the air flowing through the first circulation path, and the heat transfer flow path (92-1 to 92-12) configured to transfer heat from the evaporator to the condenser by circulating the heating medium between the evaporator and the condenser.

According to the above configuration, the passenger compartment can be heated using the waste heat of the electric components. Therefore, the waste heat of the electric components can be effectively utilized without being wasted. In addition, energy for heating the passenger compartment can be saved.

In the above aspect, the electric device may be the motor of the rotor (20, 22) configured to generate upward or forward thrust, and the electric components may be the circuit components connected to the motor.

The motor used for the rotor of the moving body requires a large amount of electric power. Therefore, the amount of the waste heat of the electric components connected to the motor is large. According to the above configuration, since the waste heat is utilized, it is possible to further increase the heating efficiency.

According to an aspect of the second invention, provided is the moving object (10) including: the passenger compartment (24) configured to accommodate a person; the component compartment (26) configured to accommodate the plurality of electric components electrically connected to the electric device; the first introduction opening (32) and the second introduction opening (34) each configured to introduce air from the outside to the inside of the fuselage (12); the first air conditioning system (28) including the first circulation path (42) connected to the passenger compartment, the first air conditioning system being configured to perform air conditioning of the passenger compartment by circulating, through the first path formed by the passenger compartment and the first circulation path, the air introduced to the inside of the fuselage from the first introduction opening; the second air conditioning system (30) including the second circulation path (52) connected to the component compartment, the second air conditioning system being configured to perform air conditioning of the component compartment by circulating, through the second path formed by the component compartment and the second circulation path, the air introduced to the inside of the fuselage from the second introduction opening; and the heat utilization circuit (64) configured to heat the passenger compartment with waste heat from the component compartment, wherein the heat utilization circuit includes: the evaporator (54) configured to absorb heat from the air flowing through the second circulation path; the condenser (46) configured to release heat to the air flowing through the first circulation path; and the heat transfer flow path (92-1 to 92-12) configured to transfer heat from the evaporator to the condenser by circulating the heating medium between the evaporator and the condenser.

According to the above configuration, the passenger compartment can be heated using the waste heat of the electric components. Therefore, the waste heat of the electric components can be effectively utilized without being wasted. In addition, energy for heating the passenger compartment can be saved.

In the above aspect, the second air conditioning system may include the bypass path (102) configured to form a part of the second circulation path and bypass the evaporator, and the flap (104) configured to open and close the bypass path, and the flap may close in a state where the evaporator allows air to pass therethrough, and may open as the pressure on the upstream side of the second circulation path becomes higher than the pressure on the downstream side of the second circulation path due to clogging of the evaporator.

According to the above configuration, since the flap opens due to clogging of the evaporator, the air constantly flows through the second circulation path. As a result, air is constantly supplied to the component compartment. Therefore, according to the present embodiment, it is possible to continuously cool the electric components.

In the above aspect, the moving object may further include the cooling circuit (66) configured to cool the battery (68) serving as the power source of the electric device, and the cooling circuit may include the cooling flow path (112-1 to 112-3) configured to circulate, through the path including the periphery of the battery, the coolant that absorbs heat from the battery, and the chiller (74) included in the heat transfer flow path and the cooling flow path and configured to perform heat exchange between the heating medium and the coolant.

According to the above configuration, the passenger compartment can be heated using the waste heat of the battery. Therefore, the waste heat of the battery can be effectively utilized without being wasted. In addition, energy for heating the passenger compartment can be saved.

In the above aspect, the electric device may be the motor of the rotor (20, 22) configured to generate upward or forward thrust, and the electric components may be the circuit components connected to the motor.

The motor used for the rotor of the moving body requires a large amount of electric power. Therefore, the amount of the waste heat of the electric components connected to the motor is large. According to the above configuration, since the waste heat is utilized, it is possible to further increase the heating efficiency.

Note that the present invention is not limited to the above disclosure, and various modifications are possible without departing from the essence and gist of the present invention.

For example, the present invention is also applicable to moving objects such as electric vehicles and electric ships.

The invention claimed is:

1. A moving object comprising:
   a passenger compartment configured to accommodate a person;
   a component compartment configured to accommodate a plurality of electric components electrically connected to an electric device;
   a first introduction opening and a second introduction opening each configured to introduce air from an outside to an inside of a fuselage;
   a first air conditioning system including a first circulation path connected to the passenger compartment, the first air conditioning system being configured to perform air conditioning of the passenger compartment by circulating, through a first path formed by the passenger compartment and the first circulation path, the air introduced to the inside of the fuselage from the first introduction opening;
   a second air conditioning system including a second circulation path connected to the component compartment, the second air conditioning system being configured to perform air conditioning of the component compartment by circulating, through a second path formed by the component compartment and the second circulation path, the air introduced to the inside of the fuselage from the second introduction opening;
   a first communication path configured to allow the passenger compartment and the component compartment to communicate with each other;

a second communication path configured to open the component compartment to the outside of the fuselage;

a first door that is provided at a merging portion in the first circulation path where inside air flowing from a passenger compartment merges with outside air flowing from the first introduction opening and is configured to adjust a ratio between the inside air flowing from the passenger compartment and the outside air flowing from the first introduction opening in air supplied to the passenger compartment; and a second door that is provided at a merging portion in the second circulation path where inside air flowing from the component compartment merges with outside air flowing from the second introduction opening and is configured to adjust a ratio between the inside air flowing from the component compartment and the outside air flowing from the second introduction opening in air supplied to the component compartment, wherein a portion of air in the passenger compartment flows through the first circulation path and returns to the passenger compartment, and remaining air in the passenger compartment flows through the first communication path and is introduced into the component compartment, and a portion of air in the component compartment flows through the second circulation path and returns to the component compartment, and remaining air in the component compartment flows through the second communication path and is discharged to the outside of the fuselage.

2. A moving object comprising:

a passenger compartment configured to accommodate a person;

a component compartment configured to accommodate a plurality of electric components electrically connected to an electric device;

a first introduction opening and a second introduction opening each configured to introduce air from an outside to an inside of a fuselage;

a first air conditioning system including a first circulation path connected to the passenger compartment, the first air conditioning system being configured to perform air conditioning of the passenger compartment by circulating, through a first path formed by the passenger compartment and the first circulation path, the air introduced to the inside of the fuselage from the first introduction opening;

a second air conditioning system including a second circulation path connected to the component compartment, the second air conditioning system being configured to perform air conditioning of the component compartment by circulating, through a second path formed by the component compartment and the second circulation path, the air introduced to the inside of the fuselage from the second introduction opening;

a first communication path configured to allow the passenger compartment and the component compartment to communicate with each other;

a second communication path configured to open the component compartment to the outside of the fuselage; and a heat utilization circuit configured to heat the passenger compartment with waste heat from the component compartment, wherein a portion of air in the passenger compartment flows through the first circulation path and returns to the passenger compartment, and remaining air in the passenger compartment flows through the first communication path and is introduced into the component compartment, a portion of air in the component compartment flows through the second circulation path and returns to the component compartment, and remaining air in the component compartment flows through the second communication path and is discharged to the outside of the fuselage, the heat utilization circuit includes:

an evaporator that is provided in the second circulation path and is configured to absorb heat from the air flowing through the second circulation path;

a condenser that is provided in the first circulation path and is configured to release heat to the air flowing through the first circulation path; and a heat transfer flow path configured to transfer heat from the evaporator to the condenser by circulating a heating medium between the evaporator and the condenser.

3. The moving object according to claim 1, wherein the electric device is a motor of a rotor configured to generate upward or forward thrust, and the electric components are circuit components connected to the motor.

4. A moving object comprising:

a passenger compartment configured to accommodate a person;

a component compartment configured to accommodate a plurality of electric components electrically connected to an electric device;

a first introduction opening and a second introduction opening each configured to introduce air from an outside to an inside of a fuselage;

a first air conditioning system including a first circulation path connected to the passenger compartment, the first air conditioning system being configured to perform air conditioning of the passenger compartment by circulating, through a first path formed by the passenger compartment and the first circulation path, the air introduced to the inside of the fuselage from the first introduction opening;

a second air conditioning system including a second circulation path connected to the component compartment, the second air conditioning system being configured to perform air conditioning of the component compartment by circulating, through a second path formed by the component compartment and the second circulation path, the air introduced to the inside of the fuselage from the second introduction opening; and a heat utilization circuit configured to heat the passenger compartment with waste heat from the component compartment, wherein the heat utilization circuit includes:

an evaporator that is provided in the second circulation path and is configured to absorb heat from the air flowing through the second circulation path;

a condenser that is provided in the first circulation path and is configured to release heat to the air flowing through the first circulation path; and a heat transfer flow path configured to transfer heat from the evaporator to the condenser by circulating a heating medium between the evaporator and the condenser.

5. The moving object according to claim 4, wherein the second air conditioning system includes:

a bypass path configured to form a part of the second circulation path and bypass the evaporator; and a flap configured to open and close the bypass path, and the flap closes in a state where the evaporator allows air to pass therethrough, and opens as a pressure on an upstream side of the second circulation path becomes higher than a pressure on a downstream side of the second circulation path due to clogging of the evaporator.

6. The moving object according to claim 4, further comprising a cooling circuit configured to cool a battery serving as a power source of the electric device, wherein the cooling circuit includes:

a cooling flow path configured to circulate, through a path including a periphery of the battery, a coolant that absorbs heat from the battery; and a chiller included in the heat transfer flow path and the cooling flow path and configured to perform heat exchange between the heating medium and the coolant.

7. The moving object according to claim 4, wherein the electric device is a motor of a rotor configured to generate upward or forward thrust, and the electric components are circuit components connected to the motor.

8. The moving object according to claim 2, wherein the electric device is a motor of a rotor configured to generate upward or forward thrust, and the electric components are circuit components connected to the motor.

* * * * *